US011370404B2

(12) United States Patent
Michaelsen et al.

(10) Patent No.: US 11,370,404 B2
(45) Date of Patent: Jun. 28, 2022

(54) ELECTRONICALLY CONTROLLABLE BRAKING SYSTEM HAVING TWO LEVELS OF REDUNDANCY

(71) Applicant: ZF CV Systems Hannover GmbH, Hannover (DE)

(72) Inventors: Arne Michaelsen, Seelze (DE); Robert Otremba, Ronnenberg (DE); Julian Van Thiel, Grossburgwedel (DE)

(73) Assignee: ZF CV SYSTEMS HANNOVER GMBH, Hannover (DE)

( * ) Notice: Subject to any disclaimer, the term of this patent is extended or adjusted under 35 U.S.C. 154(b) by 0 days.

(21) Appl. No.: 17/437,441

(22) PCT Filed: Mar. 4, 2020

(86) PCT No.: PCT/EP2020/055699
§ 371 (c)(1),
(2) Date: Sep. 9, 2021

(87) PCT Pub. No.: WO2020/182575
PCT Pub. Date: Sep. 17, 2020

(65) Prior Publication Data
US 2022/0089137 A1    Mar. 24, 2022

(30) Foreign Application Priority Data

Mar. 12, 2019 (DE) .................... 10 2019 106 274.8

(51) Int. Cl.
*B60T 13/66* (2006.01)
*B60T 13/68* (2006.01)

(52) U.S. Cl.
CPC .......... *B60T 13/662* (2013.01); *B60T 13/683* (2013.01); *B60T 2240/00* (2013.01); *B60T 2270/10* (2013.01); *B60T 2270/402* (2013.01)

(58) Field of Classification Search
CPC .... B60T 13/662; B60T 13/683; B60T 13/588; B60T 7/12; B60T 2270/413;
(Continued)

(56) References Cited

U.S. PATENT DOCUMENTS 10,730,499 B2    8/2020  Otremba
2018/0334150 A1*  11/2018  Palomba ................. B60T 13/18
(Continued)

FOREIGN PATENT DOCUMENTS

DE         10357373 A1    7/2005
DE    102014006615 A1   11/2015
(Continued)

OTHER PUBLICATIONS

Translation of German Patent No. DE 102014006615 obtained from website: https://worldwide.espacenet.com/ on Jan. 19, 2022.*

*Primary Examiner* — Pamela Rodriguez
(74) *Attorney, Agent, or Firm* — Leydig, Voit & Mayer, Ltd.

(57) ABSTRACT

An electronically controllable braking system for a commercial vehicle is provided, including a service brake system having a front axle brake circuit with a front axle modulator, a rear axle brake circuit, and a central control module. The central control module is configured to implement a braking specification via the front axle brake circuit and the rear axle brake circuit. A parking brake module that is configured, in the event of a defect in the central control module, to process the braking requirement and to output a rear axle redundancy brake pressure to spring-brake parts for the redundant implementation of the braking specification. It is further provided that the front axle modulator is configured to process the braking specification and to output a
(Continued)

front axle redundancy brake pressure to the front axle brakes for the further redundant implementation of the braking specification.

16 Claims, 1 Drawing Sheet

(58) Field of Classification Search
CPC ............ B60T 8/3605; B60T 2270/402; B60T 13/385; B60T 2240/00; B60T 2270/10
See application file for complete search history.

(56) References Cited

U.S. PATENT DOCUMENTS

| | | | |
|---|---|---|---|
| 2019/0152459 A1* | 5/2019 | Dieckmann | ............ B60T 17/18 |
| 2020/0070795 A1 | 3/2020 | Van Thiel | |
| 2020/0079341 A1 | 3/2020 | An Thiel | |
| 2020/0139952 A1 | 5/2020 | Van Thiel | |

FOREIGN PATENT DOCUMENTS

| | | |
|---|---|---|
| DE | 102015008377 A1 | 12/2016 |
| DE | 102015011296 A1 | 3/2017 |
| DE | 102016005318 A1 | 11/2017 |
| DE | 102017002718 A1 | 9/2018 |
| DE | 102017002719 A1 | 9/2018 |
| DE | 102017005979 A1 | 9/2018 |
| DE | 102017006356 A1 | 9/2018 |
| EP | 2090481 B1 | 11/2013 |
| WO | WO-2020/187569 A1 * | 9/2020 |

* cited by examiner

ELECTRONICALLY CONTROLLABLE BRAKING SYSTEM HAVING TWO LEVELS OF REDUNDANCY

CROSS-REFERENCE TO PRIOR APPLICATIONS

This application is a U.S. National Phase application under 35 U.S.C. § 371 of International Application No. PCT/EP2020/055699, filed on Mar. 4, 2020, and claims benefit to German Patent Application No. DE 10 2019 106 274.8, filed on Mar. 12, 2019. The International Application was published in German on Sep. 17, 2020 as WO 2020/182575 under PCT Article 21(2).

FIELD

The disclosure relates to an electronically controllable braking system, in particular an electronically controllable pneumatic braking system, for a vehicle, in particular a commercial vehicle, at least comprising a service brake system having a front axle brake circuit with a front axle modulator and front axle brakes connected thereto, a rear axle brake circuit with rear axle brakes, and a central control module connected to a vehicle BUS, wherein there can be supplied to the front axle brakes a front axle service brake pressure and to the rear axle brakes a rear axle service brake pressure, and the central control module is configured to generate a service brake control signal in dependence upon a braking specification, wherein the front axle and rear axle service brake pressure can be generated in dependence upon the service brake control signal and specified to the front axle and rear axle brakes for the implementation, under the electrical control of the central control module, of the braking specification via the front axle brake circuit and the rear axle brake circuit. The electronically controllable braking system further comprises a parking brake circuit having a parking brake module which is configured, in the event of a defect in the central control module, to process the braking specification and, at least in dependence upon the braking specification, to output a rear axle redundancy brake pressure to spring-brake parts for the redundant implementation of the braking specification. The front axle modulator is thereby connected to the central control module for receiving the service brake control signal and for outputting the front axle service brake pressure to the front axle brakes in dependence upon the service brake control signal.

BACKGROUND

A braking system in a vehicle, preferably a commercial vehicle, can be equipped with two or more service brake circuits, in which a service-brake brake pressure outputted to service brakes is regulated, and a parking brake circuit, in which a parking-brake brake pressure outputted to spring brakes or spring-brake parts of combined so-called Tristop brake cylinders is regulated. The outputting of the service-brake brake pressure, that is to say in particular of a front axle and rear axle service brake pressure, to the corresponding brakes is effected, for example, via a pressure modulator which outputs a service-brake brake pressure to the service brakes in question in accordance with a service brake braking specification in the form of a pneumatic service brake control pressure or an electrical service brake control signal.

In normal operation, the specification to the pressure modulator takes place electrically via the service brake control signal, wherein the service brake control signal is determined and outputted by a service brake control module, in particular a central module, and/or in dependence upon an assistance braking specification requested in an automated manner by an assistance system. Such an assistance system can be in particular a unit for autonomous driving or the like. In the redundancy case, for example in the event of an electrical failure of the central module, the specification to the pressure modulator frequently takes place in known braking systems via the service brake control pressure, which is specified to the pressure modulator via a pneumatic redundancy port and which is outputted, for example, by a service brake operation device which is in the form of an electro-pneumatic service brake valve and has a brake pedal, in dependence upon the service brake braking specification.

The parking brake circuit serves primarily for parking the vehicle in a parking situation or for performing auxiliary braking or emergency braking while the vehicle is moving in that, under the control of a parking brake module, a parking brake pressure is outputted, in dependence upon which the spring brakes or spring-brake parts of the combined brake cylinders are applied, wherein the parking brake pressure is reduced for the application. Such a parking brake module is described by way of example in DE 10 2015 008 377 A1. Conventionally, the parking brake circuit and the service brake circuits work separately from one another and are supplied from separate compressed air reservoirs. In some applications it is possible to replace the redundancy mechanism of the service brake outlined above by the alternative actuation of the parking brake circuit. To this end, the supply of electric power to the parking brake must usually take place independently of the supply of power to the service brake.

In the event of a failure of the electrical actuation of the service brake circuits via the central module, a pneumatic first fall-back level controlled by the driver can be formed, as described. However, if the driver is not available as a fall-back level because, for example, he is not paying attention or, in the case of more highly automated driving maneuvers, is not in position, a second fall-back level which is able to take action in an automated and electronically controlled manner can be formed, wherein the existing parking brake circuit is used for this purpose. Following detection of the electrical failure in one of the service brake circuits, the automated braking requirement is supplied to the parking brake module which, by specifying the parking brake pressure, is able to correspondingly operate the spring brakes or spring-brake parts of the combined brake cylinders in order to compensate for the electrical failure of the service brakes. Alternatively, the automated braking requirement can be supplied to the parking brake module permanently and, on detection of a failure in at least one of the service brake circuits by the parking brake module, the parking brake module can be provided for correspondingly implementing the specification of the parking brake pressure. In some circumstances, however, only one vehicle axle, on which the spring brakes in the parking brake circuit are arranged, is braked in this case. In this respect, only a rear axle redundancy brake pressure is then outputted to spring-brake parts and the rear axle braked redundantly. This can lead to a limited deceleration capacity and optionally to instabilities while the vehicle is moving.

In order to avoid this, EP 2 090 481 B1 describes an electronically controllable braking system in which a rear axle service brake circuit is controlled by a rear axle service brake control module and a front axle service brake circuit is controlled by a front axle service brake control module.

The parking brake module for the parking brake circuit is integrated in the front axle service brake control module, wherein the parking brake circuit controls spring brakes on the rear axle. The rear axle service brake control module and the components of the rear axle service brake circuit are supplied with energy by a first energy source, and the front axle service brake control module and the parking brake module with the correspondingly associated components are supplied with energy by a second energy source.

In the event of a failure of the first energy source, that is to say the rear axle service brake circuit with the service brakes on the rear axle, the front axle can be braked further via the front axle service brake circuit and the rear axle can be braked via the parking brake circuit, so that both vehicle axles can continue to be braked. The parking brake circuit thus compensates for the failure of the rear axle service brake circuit in that braking is carried out at the rear axle by the spring brakes instead of by the service brakes. In the event of a failure of the second energy source, that is to say both of the parking brake circuit at the rear axle and of the front axle service brake circuit, a service brake control signal is transmitted by the rear axle service brake control module, which signal is transmitted to the rear axle pressure modulator—as in normal operation—but additionally also to a trailer control valve of the vehicle. A corresponding control pressure is generated by the trailer control valve, which control pressure is transmitted to the trailer—if present—in order to effect braking there, and at the same time also via a redundancy pressure line to the pneumatic redundancy port at the front axle pressure modulator. The rear axle and the front axle are thus—as in normal operation—braked via the service brakes, wherein the front axle is likewise controlled by the rear axle service brake control module.

The parking brake module can further output a parking brake control pressure to the trailer control valve, which inverts it and forwards it to the service brakes of the trailer in order to allow a parking brake function to be implemented in the trailer too.

It is thus proposed in the prior art to control each service brake circuit via separate control modules and to compensate for a failure of an energy source, and thus of at least one service brake circuit, in that the still functioning brake circuit(s) undertake(s) braking at the failed vehicle axle, so that both vehicle axles can still be used for braking even in the redundancy case.

This has the disadvantage that, in electronically controlled braking systems which control the service brakes at the rear axle and the front axle, and optionally further vehicle axles, via the pressure modulator via only a central service brake control module, such compensation cannot take place, since, in the event of a failure of the energy source or of individual electrical components of the service brake circuit in question, the central service brake control module can no longer undertake the electrical actuation of the service brakes, or of the pressure modulators upstream thereof, at individual vehicle axles. It is thus possible only to switch to the pneumatic driver-controlled first fall-back level—if present in the corresponding braking system—if the driver actually also manually takes action. A purely electronic braking specification as is described in EP 2 090 481 B1, or a possible assistance braking specification specified in an automated manner, can, however, no longer be implemented.

There is further known from DE 10 2015 011 296 A1 an electronically controllable pneumatic braking system which comprises: at least one brake circuit, wherein in the at least one brake circuit brake pressures at service brakes can be regulated independently of one another, wherein there is associated with the at least one brake circuit for this purpose at least one control valve. The at least one control valve has an electronic control input for receiving an electrical control signal and a pneumatic control input for receiving a control pressure. In dependence upon the control signal or the control pressure, the at least one control valve supplies the service brakes of the at least one brake circuit with brake pressure via working ports. A first control unit is provided for transmitting the control signals in dependence upon a target vehicle deceleration for the electrical actuation of the at least one control valve, wherein the target vehicle deceleration can be specified by a first brake valve. The first brake valve specifies a first brake valve control pressure to the at least one brake circuit. The braking system further has a second brake valve for outputting a second brake valve control pressure, which second brake valve is arranged in the pneumatic braking system such that the first brake valve control pressure of the first brake valve and/or the second brake valve control pressure of the second brake valve is outputted as control pressure to the at least one control valve for the pneumatic actuation of the at least one control valve, wherein the second brake valve is electronically actuatable if electrical actuation of the at least one control valve is prevented in order to form an electronically pneumatically controlled redundancy. In this example, the two control valves thus mutually replace one another in order to produce the redundancy.

A similar system is disclosed in DE 10 2016 005 318 A1. The braking system disclosed therein again has at least two brake circuits, wherein there is associated with at least one of the at least two brake circuits an electrically and pneumatically controllable control valve and with a further of the at least two brake circuits an electrically controllable parking brake valve, for specifying brake pressures for actuating wheel brakes of the brake circuit in question. A first control unit is provided, which first control unit is configured to electrically actuate the control valve in question in dependence upon a target vehicle deceleration that is requested in an automated manner or in dependence upon a driver-specified operation via an operating device. A second control unit is provided, which second control unit is configured to electrically control the parking brake valve in dependence upon the target vehicle deceleration that is requested in an automated manner, if electrical actuation of the control valve in question is prevented, in order to form an electronically pneumatically controlled redundancy. There is further provided at least one bypass valve associated with a control valve, which bypass valve is configured to pneumatically actuate the associated control valve if the pneumatic actuation takes place in dependence upon the target vehicle deceleration requested in an automated manner or in dependence upon the driver-specified operation of the operating device, if electrical actuation of the control valve in question is prevented, in order to enhance the electronically pneumatically controlled redundancy.

A problem here is that all these systems are aimed primarily at a residual availability in the case of single faults, in order to bring the vehicle into a safe state. They are generally not suitable for allowing the vehicle to travel onwards to its destination.

SUMMARY

In an embodiment, the present disclosure provides

Accordingly, the object of the present disclosure is to create, with as little outlay as possible, a further redundancy level which allows at least the residual brake action to be provided in the event of a double fault. Double faults are understood as being in particular defects which are present both, for example, in the central module and in the parking brake module. That is to say, double faults are faults that lead to the failure of the service level and of the first electrical redundancy level which is formed via the parking brake circuit.

The disclosure achieves the object in an electronically controllable braking system of the type mentioned at the beginning in that the front axle modulator is configured, in the event of a further defect in the parking brake module, to process the braking specification and, at least in dependence upon the braking specification, to output a front axle redundancy brake pressure to the front axle brakes for the redundant implementation of the braking specification.

BRIEF DESCRIPTION OF THE DRAWINGS

The present disclosure will be described in even greater detail below based on the exemplary FIGURES. The disclosure is not limited to the exemplary embodiments. Other features and advantages of various embodiments of the present disclosure will become apparent by reading the following detailed description with reference to the attached drawings which illustrate the following.

DETAILED DESCRIPTION

The finding underlying the disclosure is that residual availability and in particular an improved residual brake action can be achieved in that a second redundancy level is formed which takes over control of the braking system in the event of a failure of the first redundancy level, and in that this second redundancy level is implemented via the front axle modulator.

This means that, in the event that both the service brake system fails, for example because the central module has a defect, and also the first redundancy level fails, for example because the parking brake module has a defect, the front axle modulator takes over control. The first-mentioned defect can in this case be a serious fault, in particular an electrical or electro-pneumatic fault. In the event of such faults, the front axle modulator can then act as the second fall-back level, or also as an alternative to the first fall-back level or acting in addition. That is to say, a second redundancy system is integrated in the front axle modulator.

In order to implement embodiments of the disclosure, the front axle modulator is preferably connected by a BUS connection to the central control module and/or to the parking brake module. The BUS connection can be a direct BUS connection or a network communication (e.g., CAN BUS or the like). The connection can also be produced only indirectly via the vehicle BUS. In this manner, the front axle modulator can receive data and signals of the central control module and/or of the parking brake module, such as, for example, signals which indicate the availability thereof.

In addition, the vehicle modulator is preferably connected to the vehicle BUS. In this manner, the front axle modulator can be connected to a unit for autonomous driving and receive braking specifications therefrom. This is particularly advantageous when the central control module and the parking brake module both fail completely and the front axle modulator can in this way then communicate directly with the unit for autonomous driving via the vehicle BUS in order thus to control the braking system.

According to a further preferred embodiment it is provided that the central control unit, the parking brake module and the front axle modulator are supplied by substantially separate first, second and third power sources. As a result, a redundancy can reliably be implemented, and a residual availability can be ensured even in the event of failure of one or two power sources.

According to a further preferred embodiment, the front axle brake circuit has first and second redundancy ABS (Anti-lock Braking System) valves or redundantly controls existing ABS valves in the service brake circuit for the traction-controlled outputting of the front axle redundancy brake pressure, wherein the first and second redundancy ABS valves are connected to the parking brake module for receiving electrical switching signals. If existing ABS valves in the service brake circuit are redundantly actuated, these usually existing ABS valves are preferably also connected to the parking brake module, so that they too can receive switching signals from the parking brake module. In this manner, traction control at the front axle can also be implemented in the case of a redundant outputting of the front axle brake pressure via an electrical implementation of brake requirement signals in the parking brake module. Likewise, in the case of a purely pneumatically controlled redundancy of a front axle and an electrical control of the rear axle, traction control could be achieved via the redundancy ABS valves or the redundantly actuated usually present ABS valves.

It is further preferably provided that the rear axle brake circuit has third and fourth redundancy ABS valves for the traction-controlled outputting of the rear axle redundancy brake pressure, wherein the third and fourth redundancy ABS valves are connected to the parking brake module for receiving electrical switching signals. In this manner, traction control can also be implemented in the case of the outputting of the rear axle redundancy brake pressure. The rear axle redundancy brake pressure is outputted in particular to spring-brake parts or spring brakes on the rear axle. That is to say, it is possible in this embodiment to achieve in a traction-controlled manner a braking action at the rear axle which is implemented via spring-brake parts or spring brakes.

In a further preferred embodiment there is provided a redundancy ESC (Electronic Stability Control) module which is connected to the parking brake module or integrated therewith. The braking system according to the present exemplary embodiment additionally preferably has a usual ESC module which, for example, can be connected to the central control module or integrated therewith. If the usual ESC module is integrated with the central control module, it can happen that, in the event of a defect of the central control module, the ESC module also fails. If control of the braking system is then effected by the parking brake module in a first redundancy level, it is preferred that stability control can also take place here too and that in this respect a redundancy ESC module is provided for the parking brake module. In this manner, the driving stability can also be improved further in the redundancy case.

Similarly, a redundant steering angle sensor is preferably also provided. This can be connected, for example, in such a manner that it is used only for the first and second redundancy levels.

In a further preferred embodiment it is provided that the front axle modulator has a pneumatic front axle brake pressure port for receiving a pneumatic braking specification, wherein the front axle modulator is configured to output the front axle brake pressure pneumatically on the basis of the pneumatic braking specification. The pneumatic braking specification can be outputted, for example, by a brake signal transmitter, such as in particular a pneumatic brake pedal, or can be the pressure of a further or additional axle, which pressure is correspondingly tapped at that axle. In this manner, the front axle modulator also permits pneumatic redundancy, in particular in the event that all the electronics present in the front axle modulator fails.

The braking system preferably comprises a brake signal transmitter which is connected via a first electrical brake signal transmitter line to the central control module and via a second electrical brake signal transmitter line to the parking brake module. In this manner, both the central control module and the parking brake module receive corresponding braking requirement signals directly from the brake signal transmitter and, independently of the functioning of one or the other module, both modules continue to receive the braking requirements. However, it is also conceivable that the brake signal transmitter is additionally or alternatively connected to one or both of these modules via a vehicle BUS.

The brake signal transmitter preferably also has a pneumatic brake signal transmitter line, wherein the brake signal transmitter is then connected via the pneumatic brake signal transmitter line to the front axle modulator for the outputting of the pneumatic braking specification at the pneumatic front axle brake pressure port. In this manner, the front axle modulator can be controlled by means of the brake pedal.

It is further preferably provided that the parking brake module has a first redundancy pressure port for providing a first redundancy pressure at the pneumatic front axle brake pressure port for outputting of the redundant front axle brake pressure by the front axle modulator in the event of a defect in the central control module. In this manner it is possible, in a purely pneumatic redundancy of the front axle, to control the front axle via the parking brake module. The first redundancy pressure provided at the first redundancy pressure port of the parking brake module can in this case be outputted by the parking brake module, or can also be the rear axle redundancy brake pressure outputted by the parking brake module at the rear axle.

It is further preferred that the parking brake module has a second redundancy pressure port for receiving a second redundancy pressure which corresponds to the front axle brake pressure or a pressure derived therefrom. In this variant, a trailer control module, which conventionally transmits service brake pressures to a trailer, is preferably also integrated into the parking brake module. By providing the second redundancy pressure, a further redundancy is here provided. If the parking brake module or the trailer control module integrated therewith fails, or an electronic control unit of the parking brake module or of the trailer control module, a pressure outputted by the front axle modulator, such as, for example, the front axle brake pressure or a pressure derived therefrom, can be provided as a second redundancy pressure to the parking brake module or trailer control module in order thus to provide a pneumatic redundancy in particular also for any hitched trailer.

In a second aspect, the object mentioned at the beginning is achieved by a vehicle, in particular a commercial vehicle, having an electronically controllable braking system according to one of the above preferred embodiments of an electronically controllable braking system according to the first aspect of the disclosure. It will be appreciated that the electronically controllable braking system according to the first aspect of the disclosure and the vehicle according to the second aspect of the disclosure have the same and similar sub-aspects, as are set forth in particular in the dependent claims. In this respect, reference is made for the preferred embodiment of a vehicle to the above-described preferred embodiments of the electronically controllable braking system in its entirety.

In a third aspect, the object mentioned at the beginning is achieved by a method for controlling an electronically controllable braking system according to one of the above-described preferred embodiments of an electronically controllable braking system according to the first aspect of the disclosure, wherein the method comprises at least the following steps: determining whether the braking specification can be implemented via the front axle brake circuit and/or the rear axle brake circuit under the electrical control of the central control module; if implementation of the braking specification via the front axle brake circuit and/or the rear axle brake circuit under the electrical control of the central control module is prevented: determining whether the braking specification can be implemented via the front axle brake circuit and/or the parking brake circuit under the electrical control of the parking brake module; and if implementation of the braking specification via the front axle brake circuit and/or the parking brake circuit under the electrical control of the parking brake module is not prevented: outputting the front axle and rear axle redundancy brake pressure to the front axle brakes or to the spring-brake parts for the implementation of the braking specification via the front axle brake circuit and the parking brake circuit under the electrical control of the parking brake module.

It will be appreciated that the braking system according to the first aspect of the disclosure and the method according to the third aspect of the disclosure have the same and similar sub-aspects, as are set forth in particular in the dependent claims. In this respect, reference is also made in respect of the method too to the above description relating to the first aspect of the disclosure in its entirety.

In a preferred embodiment of the method it is provided, in the case where implementation of the braking specification via the front axle brake circuit and/or the parking brake circuit under the electrical control of the parking brake module is prevented: determining whether the braking specification can be implemented via the front axle brake circuit and/or the parking brake circuit under the electrical control of the front axle modulator; and if implementation of the braking specification via the front axle brake circuit and/or the parking brake circuit under the electrical control of the front axle modulator is not prevented: outputting the front axle and rear axle redundancy brake pressure to the front axle brakes or spring-brake parts for the implementation of the braking specification via the front axle brake circuit and the parking brake circuit under the electrical control of the front axle modulator.

Embodiments of the disclosure will now be described below on the basis of the drawings. The drawings are not necessarily intended to illustrate the embodiments to scale; rather, the drawings are of schematic and/or slightly distorted form where expedient for explanatory purposes. With regard to additions to the teaching that emerges directly from the drawings, reference is made to the relevant prior art. Note here that numerous modifications and changes regarding the form and the detail of an embodiment may be made without departing from the general concept of the disclosure. The features of the embodiments disclosed in the description, in the drawings, and in the claims may be essential to the refinement of the embodiments, both individually and in any desired combination. Furthermore, the scope of the embodiments encompasses all combinations of at least two of the features disclosed in the description, in the drawings, and/or in the claims. The general concept of the disclosure is not restricted to the exact form or the detail of the preferred embodiments shown and described below, or restricted to subject matter which would be restricted in relation to the subject matter recited in the claims. Where dimensional ranges are stated, it is also the intention that values lying within the stated limits are disclosed, and can be used and claimed as desired, as limit values. For the sake of simplicity, the same reference designations are used below for identical or similar parts or parts with identical or similar function.

Figure 1:
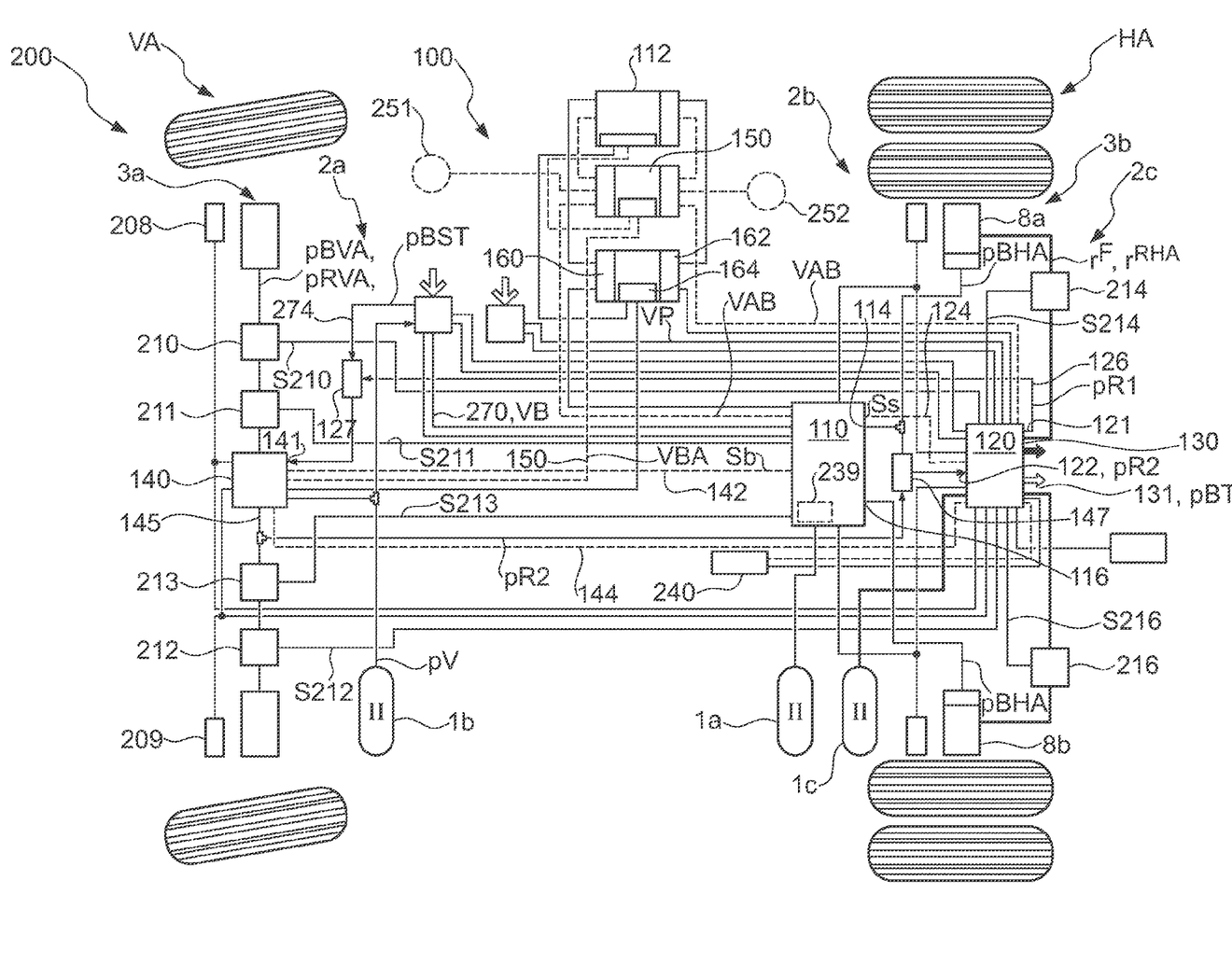
FIG. 1 shows an exemplary embodiment of an electronically controllable braking system.

FIG. 1 shows an exemplary embodiment of an electronically controllable braking system 100 for a vehicle 200, in particular a commercial vehicle 200. The braking system 100 has a first compressed air reservoir 1a, a second compressed air reservoir 1b, and a third compressed air reservoir 1c. The first and second compressed air reservoirs 1a, 1b are associated with a service brake system 102. A front axle brake circuit 2a is fed by the second compressed air reservoir 1b. A rear axle brake circuit 2b for the rear axle HA of the vehicle 200 is fed by the first compressed air reservoir 1a. Associated with the front axle brake circuit 2a are front axle brakes 3a, and associated with the rear axle brake circuit 2b are rear axle brakes 3b. The third compressed air reservoir 1c is associated with a parking brake circuit 2c which acts on spring brakes 8a, 8b or spring-brake parts 8a, 8b of so-called Tristop brake cylinders, which are combined service brakes and spring brakes, at the rear axle HA.

For controlling the braking system 100, and in particular the service brake system 102, a central control module 110 is provided. In this embodiment, the central control module 110 also comprises a rear axle modulator (not shown separately), which here is integrated into a module with the central control module 110. The central control module 110 is connected to the first compressed air reservoir 1a and receives supply pressure pV therefrom. The central control module 110 is connected to a vehicle BUS 150 and, via the vehicle BUS, inter alia to a unit for autonomous driving 112. In this manner, the central control module 110 receives an assistance braking specification VAB via the vehicle BUS 150 from the unit for autonomous driving 112. The central control module 110 then processes this assistance braking specification VAB and outputs a rear axle service brake pressure pBHA directly to the rear axle brakes 3b via a first rear axle brake channel 114 and a second rear axle brake channel 116. In this respect, the central control module 110 also acts as a rear axle modulator.

In addition, the central control module 110 transmits a service brake control signal Sb via a direct BUS connection 142 and thus provides that signal to a front axle modulator 140. The front axle modulator 140 is connected to the second compressed air reservoir 1b and receives supply pressure pV therefrom. The front axle modulator 140 receives the service brake control signal Sb and converts it into a front axle service brake pressure pBVA, which is then outputted to front axle brakes 3a. Between the front axle modulator 140 and the corresponding front axle brakes 3a there are first connected usual first and second ABS valves 211, 213, which in turn are connected to the central control unit 110 and receive switching signals S211, S213 therefrom, in order to avoid blocking of the front axle VA. For this purpose, the central control module 110 is also connected to first and second front axle wheel speed sensors 208, 209.

There are further connected between the front axle modulator 140 and the front axle brakes 3a first and second redundancy ABS valves 210, 212, which will be described in greater detail hereinbelow.

In usual operation, the assistance braking specification VAB, which indicates an intended deceleration of the vehicle 200, is thus specified in particular by the unit for autonomous driving 112 and then received by the central control module 110, which converts it directly into the rear axle service brake pressure pBHA and further transmits a service brake control signal Sb, which is then converted by the front axle modulator 140 into the front axle service brake pressure pBVA.

In the parking brake circuit 2c there is provided a parking brake module 120, which in turn is connected to the vehicle BUS 150 and can likewise receive the assistance braking specification VAB. The parking brake module 120 is additionally connected to a parking brake switch HCU and receives a parking brake signal VP therefrom. The parking brake module 120 is connected to the third compressed air reservoir 1c in order to receive supply pressure pV and, in normal operation, outputs a spring brake pressure pF to spring-brake parts 8a, 8b of the rear axle HA. The spring-brake parts 8a, 8b are so configured that they are released when air is supplied thereto and are applied owing to a spring force when air is exhausted therefrom. In normal driving operation, in order that the spring-brake parts 8a, 8b are released, the parking brake module 120 thus provides the spring brake pressure pF in order thus to release the spring-brake parts 8a, 8b. If the parking brake module 120 receives the parking brake signal VP from the parking brake switch HCU, the parking brake module 120 exhausts air from the spring-brake parts 8a, 8b and thus brakes the rear axle HA.

In addition to autonomous driving by means of the unit for autonomous driving 112, the braking system 100 also permits manual control and braking. For this purpose there is provided a brake signal transmitter BST, which here is in the form of a so-called 2e1p brake signal transmitter and is first connected via a first electrical brake signal transmitter line 270 to the central control module 110 and in this manner is able to provide a (manual) braking specification VB to the central control module 110. Via a second electrical brake signal transmitter line, the brake signal transmitter BST is connected to the parking brake module 120 and likewise provides the braking specification VB thereto. It is possible on the one hand that the central control module 110 receives the braking specification VB and in a corresponding manner provides a service brake control signal Sb to the front axle modulator 140, as has already been described in principle above. However, pneumatic braking intention outputting is also possible via the pneumatic port at the brake signal transmitter BST. In the exemplary embodiment shown, the brake signal transmitter BST is thus connected via a pneumatic brake signal transmitter line 274 to the front axle modulator 140 for the outputting of a pneumatic braking specification pBST at a pneumatic front axle brake pressure port 141 of the front axle modulator 140. The front axle modulator 140 receives the pneumatic braking specification pBST, increases the volume thereof by means of the supply pressure pV, which is provided by the second compressed air reservoir 1b, and outputs in a corresponding manner the front axle service brake pressure pBVA. In this variant, it is not necessary that the front axle modulator 140 has its own control unit.

In the braking system 100 shown in FIG. 1, a first redundancy level is formed for the event of a defect in the service brake system 120. In the first redundancy level it is provided that braking of the vehicle 200 is undertaken by the parking brake module 120. The parking brake module 120 has for this purpose its own control unit, which is integrated in the parking brake module 120 shown in FIG. 1. For this purpose, the parking brake module 120 is first connected via a BUS connection 124 or a direct electrical connection to the central control module 110 and exchanges status signals Ss therewith. Thus, for example, both the central control module 110 and the parking brake module 120 receive the assistance braking specification VAB via the vehicle BUS 150. The parking brake module 120 and the central control module 110 then communicate via the BUS connection 124 in order to mutually verify the received assistance braking specification VAB. If, for example, the parking brake module 120 thereby determines that the central control module 110 is no longer functioning correctly or is no longer functioning, the parking brake module 120 can take over control of the braking system 100. In this case, the parking brake module 120 then implements the assistance braking specification VAB and correspondingly outputs a rear axle redundancy brake pressure pRHA to the spring-brake parts 8a, 8b, in order to use them for braking the rear axle HA. The rear axle redundancy brake pressure pRHA thus preferably corresponds approximately to the inverted rear axle service brake pressure pBHA.

In order to be able to prevent blocking of the rear axle HA, third and fourth redundancy ABS valves 214, 216 are provided in the parking brake circuit 2c between the parking brake module 120 and the corresponding spring-brake parts 8a, 8b, which redundancy ABS valves in turn receive switching signals S214, S216 from the parking brake module 120. In this manner, traction-controlled braking can be accessed also when using spring-brake parts 8a, 8b on the rear axle HA for redundant braking of the rear axle HA in the first fall-back level.

In order to be able to redundantly brake also the front axle VA in this first redundancy level, for example because the electronic control unit of the front axle modulator 140 has a fault, the parking brake module 120 has a first redundancy pressure port 121 at which the parking brake module provides a first redundancy pressure pR1. The first redundancy pressure port 121 is connected via a first redundancy pressure line 126 to the front axle brake circuit 2a, more specifically to a first select high valve 127, which is connected at its other input to the pneumatic brake signal transmitter line 274. The first select high valve 127 then outputs the higher of the pneumatic braking specification pBST and the first redundancy pressure pR1 at the pneumatic front axle brake pressure port 141, so that the front axle modulator 140 pneumatically implements the pressure provided there and provides it in a volume-increased manner as front axle service brake pressure pBVA, or in the redundancy case as redundant front axle brake pressure pRVA, to the front axle brakes 3a. In the case where the first redundancy pressure pR1 is provided, it is likewise desirable to perform traction control. For this purpose there are provided the first and second redundancy ABS valves 210, 212, which receive their corresponding switching signals S210, S212 from the parking brake module 120. The parking brake module 120 is for this purpose also connected, by redundant cabling, to the first and second front axle wheel speed sensors 208, 209, in order thus to obtain speed values of the front axle VA.

In the exemplary embodiment shown (FIG. 1), a total of four ABS valves are thus provided on the front axle VA. It will be appreciated that embodiments are also preferred which have only two ABS valves in the front axle VA. In this case, the redundancy ABS valves 210, 212, for example, can be omitted. However, redundant cabling can be provided instead, such that the ABS valves 211, 212 which are normally provided are connected not only to the central control unit 110 but also to the parking brake module 120, in order to receive the corresponding switching signals therefrom.

In order to provide a second redundancy level, which can be used when there is also a defect in the first redundancy level, or which can be provided as an alternative to the first redundancy level, the front axle modulator 140 is equipped with an electronic control unit which is likewise integrated into the module shown in FIG. 1. For this purpose, the front axle modulator 140 is again connected to the vehicle BUS 150 and also receives the assistance braking specification VAB via that vehicle BUS. It has already been described above that the front axle modulator 140 is connected to the central control unit 110. In the exemplary embodiment shown, it is additionally also connected via a second BUS connection 144 to the parking brake module 120. In this respect, the three modules which are provided, the central control module 110, the parking brake module 120 and the front axle modulator 140, can verify one another. If the front axle modulator 140 thus determines that, for example, the central control module 110 and/or the parking brake module 120 are no longer functioning correctly or are no longer functioning, it is provided in this embodiment that the front axle modulator 140 takes over control of the braking system 100. In this case, the front axle modulator 140 automatically outputs the front axle service brake pressure pBVA. To this end, it implements the assistance braking specification VAB.

In the embodiment shown, the parking brake module 120 is configured so as to be integrated with a trailer control module 130, also called a TCV. The part of the parking brake module 120 which forms the trailer control module 130 serves in the case of service braking to output a trailer brake pressure pBT at a trailer brake pressure port 131 in order to brake a trailer.

In order also to be able to redundantly brake the trailer in the event of a fault of the trailer control module 130, there branches from a front axle brake pressure line 145 a second redundancy pressure line which leads to the parking brake circuit 2c, more specifically to the trailer control module 130 of the parking brake module 120. Specifically there is first provided in this exemplary embodiment, however, a second select high valve 147, the other port of which is connected to the first rear axle brake channel 114. The second select high valve 147 thus outputs at a second redundancy pressure port 122 of the parking brake module 120 in each case the higher of the second redundancy pressure pR2 and the rear axle service brake pressure pBHA. The parking brake module 120, or the part which corresponds to the trailer control module 130, is then configured pneumatically to output the trailer brake pressure pBT at the trailer brake pressure port 131 on the basis of the received second redundancy pressure pR2.

For the further formation of redundancies there is provided in the exemplary embodiment shown, in addition to the usual ESC module 239, which here is integrated into the central control module 110, also a redundancy ESC module 240. In the exemplary embodiment shown, the redundancy ESC module 240 is connected to the parking brake module 120 in order thus to be able to carry out stability control also in the redundancy case, if the central control unit 110 fails.

There is further provided in addition to the usual steering angle sensor 251 also a redundant steering angle sensor 252. The usual steering angle sensor 251 is connected to a first node of the vehicle BUS 150, and the redundant steering angle sensor 252 is connected to a second node of the vehicle BUS 150. A redundancy can thus be provided also in the case where part of the vehicle BUS 150 fails.

Finally, the braking system 100 has three separate power sources 160, 162, 164. The first power source 160 is connected to the central control unit 110, the second power source 162 is connected to the parking brake module 120, and the third power source 164 is connected to the front axle modulator 140. In this manner, the three modules are supplied with power independently of one another, so that, if one or two of the three power sources 160, 162, 164 fails/fail, control of the braking system 100 as a whole is nevertheless possible.

While the embodiments of the present disclosure have been illustrated and described in detail in the drawings and foregoing description, such illustration and description are to be considered illustrative or exemplary and not restrictive. It will be understood that changes and modifications may be made by those of ordinary skill within the scope of the following claims. In particular, the scope of the present disclosure covers further embodiments with any combination of features from different embodiments described above and below. Additionally, statements made herein characterizing an embodiment of the disclosure refer to an embodiment of the disclosure and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1*a* first compressed air reservoir
1*b* second compressed air reservoir
1*c* third compressed air reservoir
2*a* front axle brake circuit
2*b* rear axle brake circuit
2*c* parking brake circuit
3*a* front axle brakes
3*b* rear axle brakes
8*a* spring brake
8*b* spring brake
100 electronically controllable braking system
102 service brake system
110 central control module
112 unit for autonomous driving
114 first rear axle brake channel
116 second rear axle brake channel
120 parking brake module
121 first redundancy pressure port
122 second redundancy pressure port
124 BUS connection
126 first redundancy pressure line
127 first select high valve
130 trailer control module
131 trailer brake pressure port
140 front axle modulator
141 pneumatic front axle brake pressure port
142 first BUS connection
144 second BUS connection
145 front axle brake pressure line
146 second redundancy pressure line
147 second select high valve
150 vehicle BUS
160 first power source
162 second power source
163 third power source
208 first front axle wheel speed sensor
209 second front axle wheel speed sensor
210 first redundancy ABS valve
211 first ABS valve
212 second redundancy ABS valve
213 second ABS valve
239 ESC module
240 redundancy ESC module
251 steering angle sensor
252 redundant steering angle sensor
270 first electrical brake signal transmitter line
272 second electrical brake signal transmitter line
274 pneumatic brake signal transmitter line
HCU parking brake switch
VA front axle
HA rear axle
pBA trailer brake pressure
pBVA front axle service brake pressure
pBHA rear axle service brake pressure
pBST pneumatic braking specification
pBT trailer brake pressure
pRVA front axle redundancy brake pressure
pRHA rear axle redundancy brake pressure
pF spring brake pressure
pR1 first redundancy pressure
pR2 second redundancy pressure
VAB assistance braking specification
VB service brake braking specification
VP parking brake braking specification
Sb service brake control signal
Ss status signal
S210 switching signal for 210
S211 switching signal for 211
S212 switching signal for 212
S213 switching signal for 213
S214 switching signal for 214
S216 switching signal for 216

The invention claimed is:

1. An electronically controllable braking system for a vehicle, the electronically controllable braking system comprising:
a service brake system including:
a front axle brake circuit with a front axle modulator and front axle brakes connected thereto,
a rear axle brake circuit with rear axle brakes, and
a central control module connected to a vehicle BUS,
wherein a front axle service brake pressure can be supplied to the front axle brakes and a rear axle service brake pressure can be supplied to the rear axle brakes, and the central control module is configured to generate a service brake control signal in dependence upon a braking specification, wherein the front axle service brake pressure and rear axle service brake pressure can be generated in dependence upon the service brake control signal and specified to the front axle brakes and rear axle brakes, respectively, under the electrical control of the central control module for implementation of the braking specification via the front axle brake circuit and the rear axle brake circuit; and a parking brake circuit including a parking brake module configured, in the event of a defect in the central control module, to process the braking specification and to output, at least in dependence upon the braking specification, a rear axle redundancy brake pressure to spring-brake parts for redundant implementation of the braking specification; wherein the front axle modulator is connected to the central control module for receiving the service brake control signal and outputting the front axle service brake pressure to the front axle brakes in dependence upon the service brake control signal, the front axle modulator is further configured, in the event of a further defect in the parking brake module, to process the braking specification and to output, at least in dependence upon the braking specification, a front axle redundancy brake pressure to the front axle brakes for the redundant implementation of the braking specification.

2. The electronically controllable braking system according to claim 1, wherein the front axle modulator is connected by a BUS connection to the central control module and/or the parking brake module.

3. The electronically controllable braking system according to claim 1, wherein the front axle modulator is connected to a vehicle BUS.

4. The electronically controllable braking system according to claim 1, wherein the central control unit, the parking brake module and the front axle modulator are supplied by substantially separate first, second and third power sources, respectively.

5. The electronically controllable braking system according to claim 1, wherein the front axle brake circuit has first and second redundancy ABS (Anti-lock Braking System) valves or redundantly actuated ABS valves for traction-controlled outputting of the front axle redundancy brake pressure, wherein the first and second redundancy ABS valves or the redundantly actuated ABS valves are connected to the parking brake module for receiving electrical switching signals.

6. The electronically controllable braking system according to claim 1, wherein the rear axle brake circuit has third and fourth redundancy ABS (Anti-lock Braking System) valves for traction-controlled outputting of the rear axle redundancy brake pressure, wherein the third and fourth redundancy ABS valves are connected to the parking brake module for receiving electrical switching signals.

7. The electronically controllable braking system according to claim 1, further comprising a redundancy ESC (Electronic Stability Control) module connected to the parking brake module or integrated therewith.

8. The electronically controllable braking system according to claim 1, further comprising a redundant steering angle sensor.

9. The electronically controllable braking system according to claim 1, wherein the front axle modulator includes a pneumatic front axle brake pressure port for receiving a pneumatic braking specification, wherein the front axle modulator is configured to pneumatically output the front axle brake pressure on the basis of the pneumatic braking specification.

10. The electronically controllable braking system according to claim 9, wherein the parking brake module includes a first redundancy pressure port for providing a first redundancy pressure at the pneumatic front axle brake pressure port for the outputting of the redundant front axle brake pressure by the front axle modulator in the event of a defect in the central control module.

11. The electronically controllable braking system according to claim 1, comprising a brake signal transmitter connected to the central control module via a first electrical brake signal transmitter line and connected to the parking brake module via a second electrical brake signal transmitter line.

12. The electronically controllable braking system according to claim 11, wherein the brake signal transmitter is connected to the front axle modulator via a pneumatic brake signal transmitter line for outputting of a pneumatic braking specification at a pneumatic front axle brake pressure port.

13. The electronically controllable braking system according to claim 1, wherein the parking brake module includes a second redundancy pressure port for receiving a second redundancy pressure corresponding to the front axle brake pressure or a pressure derived therefrom.

14. A vehicle having an electronically controllable braking system according to claim 1.

15. A method for controlling the electronically controllable braking system according to claim 1, the method comprising:

determining whether the braking specification can be implemented via the front axle brake circuit and/or the rear axle brake circuit under the electrical control of the central control module;

responsive to determining that implementation of the braking specification via the front axle brake circuit and/or the rear axle brake circuit under the electrical control of the central control module is prevented:

determining whether the braking specification can be implemented via the front axle brake circuit and/or the parking brake circuit under the electrical control of the parking brake module; and responsive to determining that implementation of the braking specification via the front axle brake circuit and/or the parking brake circuit under the electrical control of the parking brake module is not prevented:

outputting the front axle redundancy brake pressure and the rear axle redundancy brake pressure to the front axle brakes or the spring-brake parts for the implementation of the braking specification via the front axle brake circuit and the parking brake circuit under the electrical control of the parking brake module.

16. The method according to claim 15, wherein, responsive to determining that implementation of the braking specification via the front axle brake circuit and/or the parking brake circuit under the electrical control of the parking brake module is prevented:

determining whether the braking specification can be implemented via the front axle brake circuit and/or the parking brake circuit under the electrical control of the front axle modulator; and responsive to determining that implementation of the braking specification via the front axle brake circuit and/or the parking brake circuit under the electrical control of the front axle modulator is not prevented:

outputting the front axle redundancy brake pressure and the rear axle redundancy brake pressure at the front axle brakes or the spring-brake parts for the implementation of the braking specification via the front axle brake circuit and the parking brake circuit under the electrical control of the front axle modulator.

\* \* \* \* \*